(12) United States Patent
Lehenbauer et al.

(10) Patent No.: US 7,500,179 B2
(45) Date of Patent: Mar. 3, 2009

(54) METHOD FOR OPTIMIZING SPACE ALLOCATION IN TABLE LAYOUT

(75) Inventors: Daniel R. Lehenbauer, Redmond, WA (US); Jian Yuan, New Haven, CT (US)

(73) Assignee: Microsoft Corporation, Redmond, WA (US)

( * ) Notice: Subject to any disclaimer, the term of this patent is extended or adjusted under 35 U.S.C. 154(b) by 718 days.

(21) Appl. No.: 10/910,823

(22) Filed: Aug. 4, 2004

(65) Prior Publication Data

US 2006/0031754 A1 Feb. 9, 2006

(51) Int. Cl.
*G06F 17/00* (2006.01)
(52) U.S. Cl. .................................... 715/227; 715/243
(58) Field of Classification Search ................ 715/517, 715/509, 510, 504, 212, 217, 227, 243
See application file for complete search history.

(56) References Cited

U.S. PATENT DOCUMENTS

| | | | | |
|---|---|---|---|---|
| 5,231,579 | A * | 7/1993 | Tsuchiya et al. | 715/508 |
| 6,088,708 | A * | 7/2000 | Burch et al. | 715/509 |
| 6,944,818 | B2 * | 9/2005 | Newman et al. | 715/234 |
| 6,976,212 | B2 * | 12/2005 | Newman et al. | 715/517 |
| 7,340,677 | B2 * | 3/2008 | Cowperthwaite | 715/719 |
| 2002/0138512 | A1 * | 9/2002 | Buresh et al. | 707/507 |
| 2003/0028560 | A1 * | 2/2003 | Kudrolli et al. | 707/509 |
| 2004/0205536 | A1 * | 10/2004 | Newman et al. | 715/509 |
| 2006/0206497 | A1 * | 9/2006 | Aureglia et al. | 707/100 |

OTHER PUBLICATIONS

Ng, Hwee Tou, et al, "Learning to Recognize Tables in Free Text", Proceedings of the 37th Annual Meeting of the Association for Computing Linguistics on Computational Linguistics, Jun. 1999, pp. 443-450.*

Anderson, R.J. et al., "The Table Layout Problem", *Proceedings of the 15th Annual Symposium on Computational Geometry*, 1999, 115-123.

Hurst, M. et al., "Layout and Language: Preliminary Investigations in Recognizing the Structure of Tables" *Proceedings of the 4th International Conference on Document Analysis and Recognition*, 1997, 2, 1043-1047.

Shang-Rong, R. et al., "nested Table Layout Based on Object-Oriented Template", *Journal of Computer Aided Design & Computer Graphics*, 2000, 12(9), 705-710.

* cited by examiner

*Primary Examiner*—Laurie Ries
(74) *Attorney, Agent, or Firm*—Woodcock Washburn LLP

(57) ABSTRACT

Space is allocated within a table layout for a plurality of items to be placed therein by application of a first rule in which each item is ordered according to increasing column span for the item. Thereafter, a second rule is applied for each ordered item. The second rule recognizes that space need not necessarily be added to the right-most column for an item at issue, and that space needed for the right-most column for an item at issue should be 'borrowed' from the next column to the right, presuming such space is available and would not impinge on any other item. Finally, the second rule recognizes that despite everything, situations can arise where there is no elegant way to allocate space for all items within a table layout. In such a circumstance, space is added to the right-most column for the item at issue.

17 Claims, 5 Drawing Sheets

METHOD FOR OPTIMIZING SPACE ALLOCATION IN TABLE LAYOUT

TECHNICAL FIELD

The present invention relates to a method for allocating space within a table layout for objects to be placed therein. More particularly, the present invention relates to allocating such space within a table layout for placing controls therein, where each such control may contain content that may vary, or where the table layout may have a size that varies, and where each variation of the table layout and/or the controls requires the space therewithin to be re-allocated.

BACKGROUND OF THE INVENTION

In many computer-type applications, a plurality of items that are to be displayed to a user in a defined area on a display or the like are organized according to a table layout. As may be appreciated, the defined area may be a 'window' within the display devoted to some defined functional commonality. For example, if the defined area represents options for settings in connection with a computer application, the items may relate to displaying and setting such options. Likewise, if the defined area represents a shut-down interface in connection with a computer application, the items may relate to available choices for proceeding with a shut-down of such application. Thus, each item in such defined area likely has some relationship to the functional commonality, and such item may for example be a text entry box, a text display box, a selection button, a check mark line, a tab, a drop-down line, or the like.

Typically, a table layout for a defined area includes a plurality of defined cells arranged in defined rows and columns, and each item to be set forth within the table layout is specified according to defined attributes including row and column placement and extent, and may have a defined row height and/or column width, perhaps expressed in pixels or other display units. Thus, each item is positioned within the table layout with the other items based on the attributes thereof, and in doing so the table layout is adjusted as necessary and/or desirable, at least within a defined framework.

That is, the table layout itself is specified according to defined attributes, including a number of rows, a number of columns, a row height, a column width, a column width for at least some columns, a row height for at least some rows, and the like. Note, though, that in the course of placing items within a table layout, at least some of the table layout attributes are modified so that the table layout can accommodate the items. For example, if an item is to be placed in a cell at a particular row and column of the table, and the item has a row height of 20 pixels and a column width of 100 pixels, the cell receiving such item should be modified as necessary to have a column width of at least 100 pixels and a row height of at least 20 pixels, and the table layout should be adjusted accordingly, presuming of course that other table layout attributes do not dictate otherwise.

Note that in at least some instances, each item is a 'control' and the table layout is itself a 'control' containing the controls representing the items. As may be appreciated, using controls allows a designer to design the table layout and the items therein by selecting pre-defined stock controls from an available toolbox containing same and then by modifying each selected control as necessary to result in a final form. Typically, each control includes functionality both to aid the designer in designing with same and to aid the user in using same, of course along with base functionality that allows the control to operate in the manner required.

In many computer-type applications, table layouts are dynamic in that such table layouts can change based on several factors. For example, a table layout may change based on a user re-sizing same, based on an item being added thereto or removed therefrom, based on content displayed in connection with an item changing, based on a size of an item changing, etc. Significantly, each time a dynamic table layout changes, space allocation therewithin must be performed anew.

Thus, heuristics have been developed to allocate space within a table layout in a relatively time-efficient manner. However, situations arise wherein space allocation in a table layout is problematic. In one instance in particular, in a table layout where items are allowed to span multiple rows and/or columns, determining the size of the rows and columns based on the aforementioned heuristics becomes challenging. Ideally, and for purposes of both efficient space utilization and aesthetics, there should be a minimum of extra space in any row/column, and space should get distributed evenly among rows/columns, if at all possible. However, under certain circumstances, the aforementioned heuristics are lacking in achieving such goals.

Accordingly, a need exists for a heuristic that is better suited to allocating space within a table layout. In particular, a need exists for such a heuristic that is not complex and therefore can be performed in real-time or near-real-time in response to changes to a dynamic table layout. Finally, a need exists for a heuristic that finds or at least approximates an ideal distribution of items within a table layout in most cases, without solving systems of equations.

SUMMARY OF THE INVENTION

The aforementioned needs are satisfied at least in part by the present invention in which a method is provided to allocate space within a table layout for a plurality of items to be placed therein. The table layout includes a plurality of cells arranged in rows and columns, each item has a defined width and a defined location including a left-most column and a number of columns spanned from such left-most column, and each column has a uniform width adjustable to accommodate the defined width of an item placed in such column.

In the method, a first rule is applied to order each item according to increasing column span for the item, and then a second rule is applied for each ordered item. Generally, the second rule recognizes that space need not necessarily be added to the right-most column for an item at issue. Instead, space may be added to other columns spanned by the item at issue if such other columns do not serve as the left-most column for any other item for which space has already been allocated in the table layout. In addition, the second rule recognizes that space needed for the right-most column for the item at issue should be 'borrowed' from the next column to the right, presuming such space is available and would not impinge on any other item. Finally, the second rule recognizes that despite everything, situations can arise where there is no elegant way to allocate space for all items within a table layout. In such a circumstance, space is added to the right-most column for the item at issue.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 6A-6C are block diagrams showing a space allocation for a table layout of FIGS. 2A and 2B based on the Rule 2 set forth in accordance with one embodiment of the present invention.

DETAILED DESCRIPTION OF THE INVENTION

Computer Environment

Figure 1:
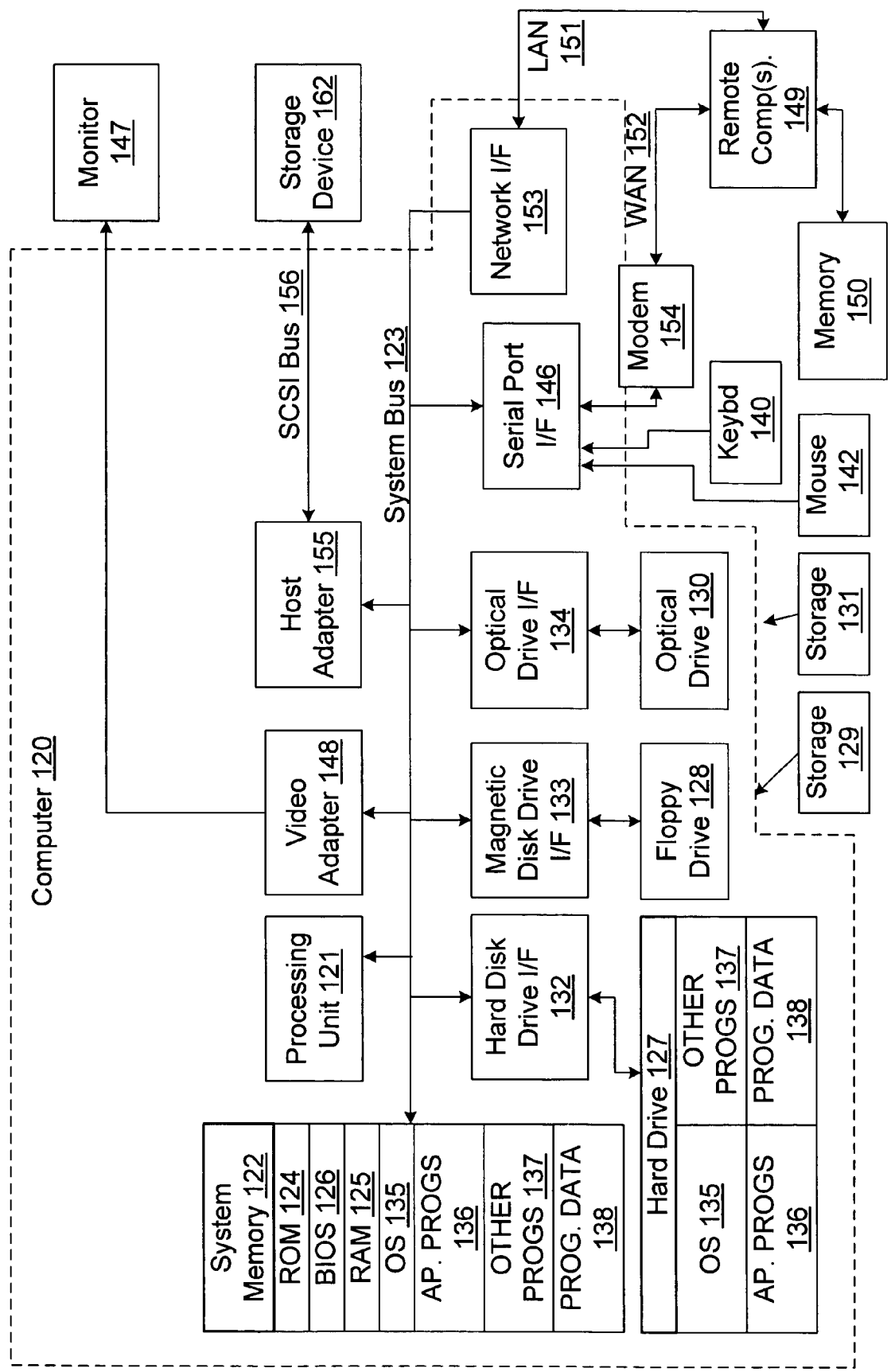
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Space Allocation Heuristic

In the present invention, column width and row height in a table layout are space-allocated according to a heuristic that takes into account the following scenarios. Note that since the methodology employed is the same for both column width and row height, only column width is discussed herein, with the understanding that the same methodology is applied to row height.

Figure 2A:
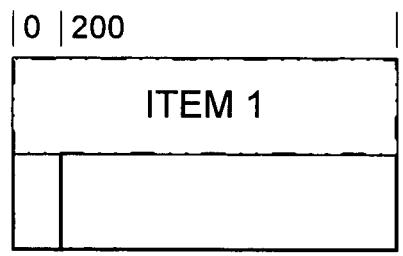
FIGS. 2A and 2B are block diagrams showing a space allocation for a table layout of defined items, and illustrate one situation in which space can be wasted.

Preliminarily, and as may be seen in FIG. 2A et seq., a table layout such as is employed in connection with the present invention includes a plurality of cells arranged in rows and columns. Thus, each cell resides in a particular row (horizontal series of cells) and column (vertical series of cells). Each column has a uniform width which may be expressed in any units of measurement, and each row likewise has a uniform height which again may be expressed in any units of measurement. Thus, setting a row height for a particular cell by extension sets a row height for all cells in the row of the particular cell. Likewise, setting a column width for a particular cell by extension sets a column width for all cells in the column of the particular cell.

In allocating space in connection with a table layout, then, the table layout already has a number of columns (and rows) defined, where each column starts with a zero width, and one or more items are to be placed in the table layout, each item starting in a particular column (and row), spanning one or more columns (and rows), and having a defined column width (and row height). Thus, as items are placed in columns (and rows) of the table layout, column widths (and row heights) are adjusted to accommodate such items.

Consider a defined table layout having two rows, two columns, and two defined items:
   item 1, starting in row 1, column 1, spanning two columns, and having a 200 pixel column width; and
   item 2, starting in row 2, column 1, spanning one columns, and having a 100 pixel column width.

If, as is seen in FIG. 2A, item 1 is added first, and presuming that needed column width for any item is created by adding pixels to only the right-most column for such item, it is seen that column width for item 1 is created by adding 200 pixels to column 2. Note that although column 1 still has a zero column width, a nominal width is shown therefor in FIG. 2A and subsequent drawings where applicable for display purposes only.

Figure 2B:
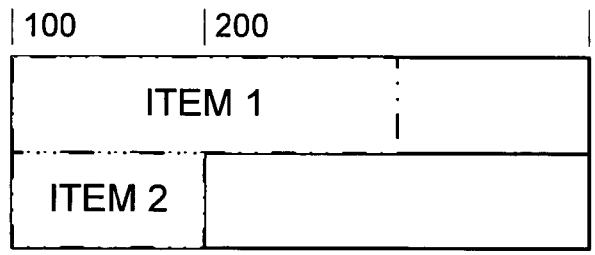

Thereafter, and as seen in FIG. 2B, adding item 2 with a 100 pixel column width results in column 1 increasing to 100 pixels. However, it is to be appreciated that by increasing column 1 to 100 pixels to accommodate item 1, the 200 pixels of item 2 now take up the 100 pixels of column 1 and only 100 pixels of column 2, with the result being that column 2 is now too wide by 100 pixels.

Figure 3A:
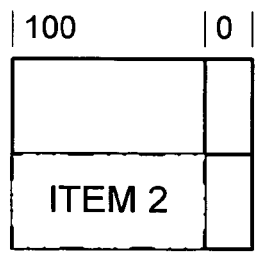
FIGS. 3A and 3B are block diagrams showing a space allocation for the table layout of FIGS. 2A and 2B based on a Rule 1 set forth in accordance with one embodiment of the present invention.
Figure 3B:
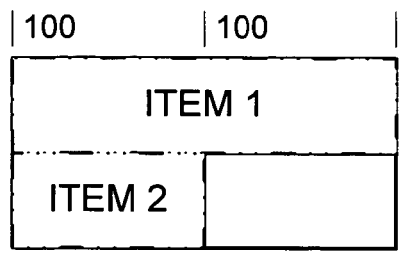

It should be appreciated, however, that if item 2 was added first and item 1 was added second, as seen in FIGS. 3A and 3B, the result would instead be that columns 1 and 2 have no wasted space. In particular, adding item 2 with a 100 pixel column width (FIG. 3A) results in column 1 increasing to 100 pixels, and then adding item 1 with a 200 pixel column width (FIG. 3B) results in column 2 increasing to 100 pixels to accommodate the 100 pixels of item 2 that do not fit in column 1.

Figure 5:
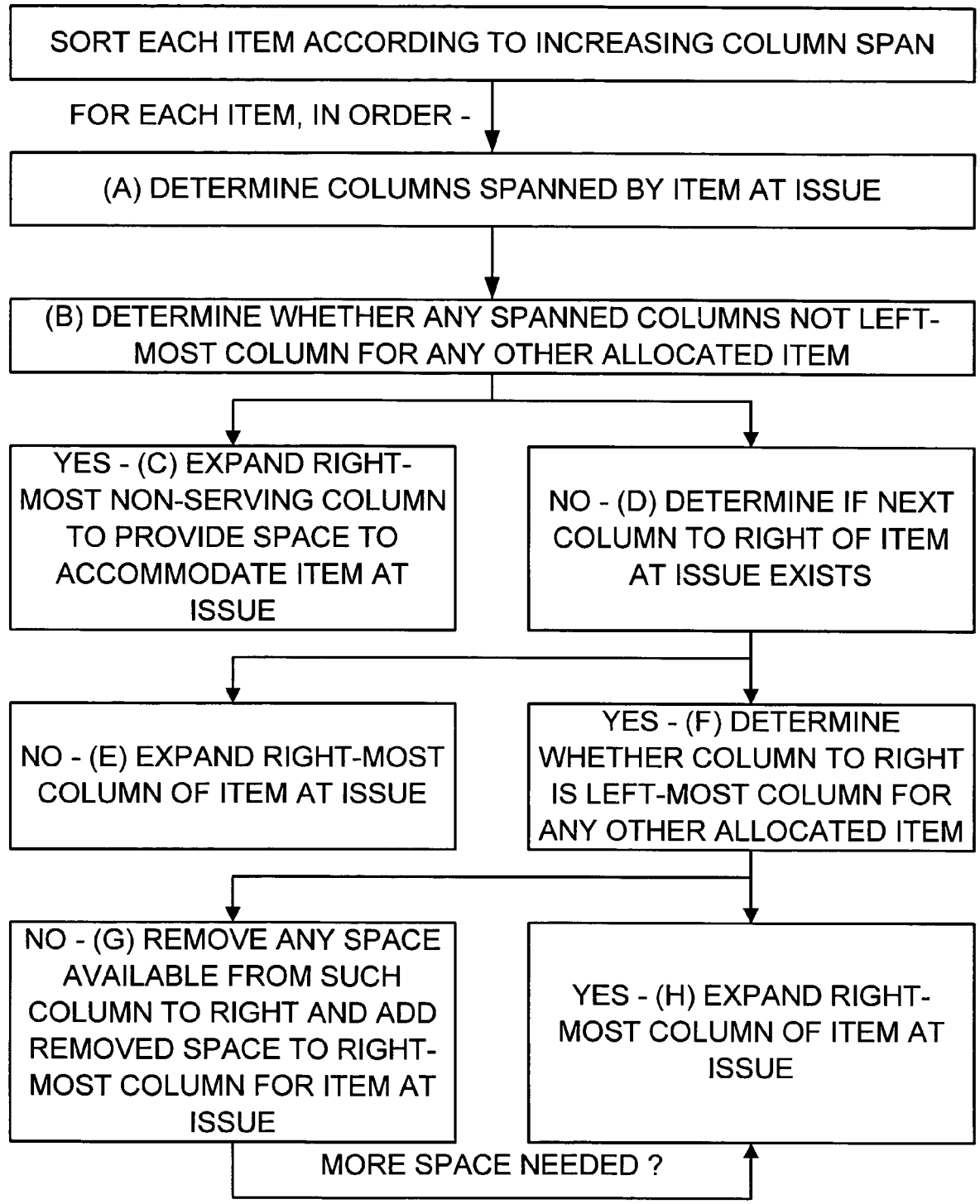
FIG. 5 is a flow diagram showing key steps performed in connection with the Rule 1 and a Rule 2 to allocate space in a table layout in accordance with one embodiment of the present invention.

In general, then, and as Rule 1, and in one embodiment of the present invention, and as seen in FIG. 5, to minimize wasted space in a table layout, when allocating space in the table layout, space for each item should be added to the table layout according to increasing column span for the item. Thus, space for each item spanning a single column should be allocated first, then space for each item spanning two columns should be allocated second, etc. In this manner, many instances where space need not have been allocated with regard to a multi-column item can be avoided.

Unfortunately, Rule 1 does not avoid all cases of wasted space. In particular, consider a defined table layout having two rows, four columns, and four defined items:
   an item 1 in column 1 only with a 100 pixel column width;
   an item 2 in column 2 only with a 100 pixel column width;
   an item 3, starting in row 1, column 3, spanning two columns, and having a 200 pixel column width; and
   an item 4, starting in row 2, column 1, spanning three columns, and having a 300 pixel column width.

Figure 4A:
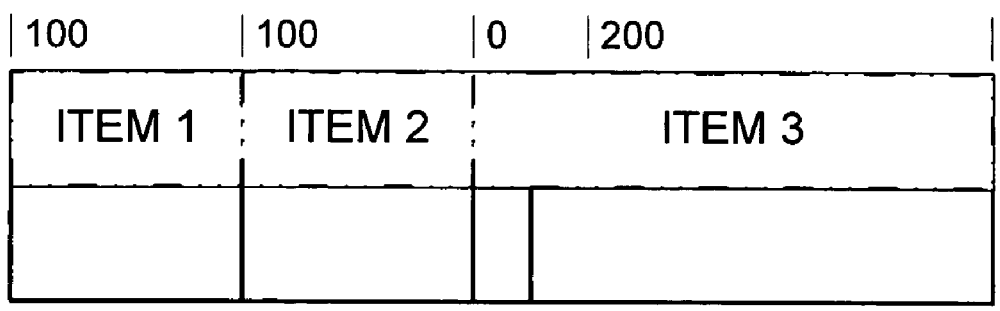
FIGS. 4A and 4B are block diagrams showing a space allocation for another table layout of defined items, and illustrate another situation in which space can be wasted.
Figure 4B:
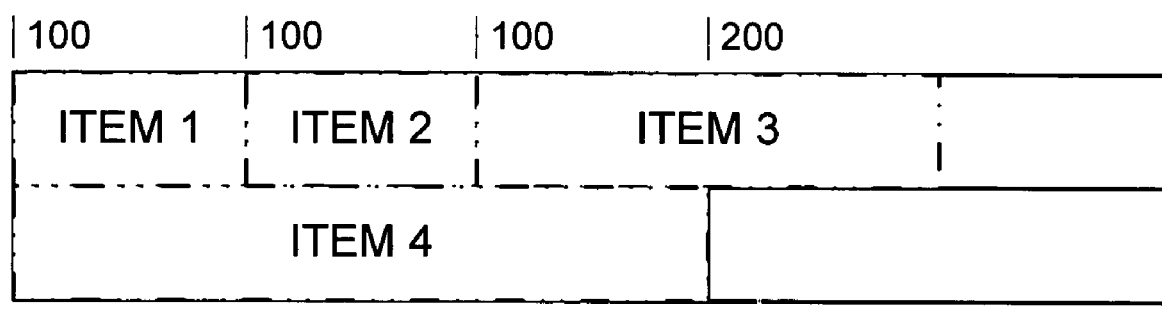

If, as is seen in FIG. 4A, and according to Rule 1, items 1 and 2 are already added and item 3 is then added third, it is seen that column width for item 3 is created by adding 200 pixels to column 4. Thereafter, and as seen in FIG. 4B, adding item 4 with the 300 pixel column width results in column 3 increasing to 100 pixels to accommodate the 100 pixels of item 4 not accommodated by the 100 pixels of column 1 and the 100 pixels of column 2. However, it is to be appreciated that by increasing column 3 to 100 pixels to accommodate item 4, the 200 pixels of item 3 now take up the 100 pixels of column 3 and only 100 pixels of column 4, with the result being that column 4 is now too wide by 100 pixels.

In one embodiment of the present invention, then, and as a Rule 2 which replaces the aforementioned presumption that needed column width space for any item is created by adding pixels to only the right-most column for such item, and as seen in FIG. 5, to determine how to allocate space for an item at issue in a table layout, (A) determine the columns spanned by the item at issue, and (B) determine whether any of the spanned columns do not serve as the left-most column for any other item for which space has already been allocated in the table layout. If any spanned column does not serve as such a left-most column, (C) expand the right-most non-serving column to provide space to accommodate the item at issue.

If, instead, each spanned column does serve as such a left-most column, (D) determine if there is a next column to the right of the item at issue. If not, (E) expand the right-most column of the item at issue to provide space to accommodate same. If so, (F) determine whether such column to the right is the left-most column for any other item for which space has already been allocated. If not, (G) remove any space available from such column to the right and add such removed space to the right-most column for the item at issue. If so, or if more space is still needed to accommodate the item at issue after application of step (G), then (H) add such space to the right-most column for the item at issue.

Significantly, Rule 2 sets out several important principles that when applied are believed to minimize wasted space in the table layout. The first principle is that space need not necessarily be added to the right-most column for the item at issue. Instead, space may be added to other columns spanned by the item at issue if such other columns do not serve as the left-most column for any other item for which space has already been allocated in the table layout.

The second principle is that space needed for the right-most column for the item at issue should be 'borrowed' from the next column to the right, presuming such space is available and would not impinge on any other item, so as to avoid the situation that arose in connection with FIGS. 4A and 4B. If indeed there is a next column to the right of the item at issue, and such column is not the left-most column for any other item, then any space allocated to such next column to the right may be transferred to the right-most column for the item at issue.

The third principle is that despite everything, situations can arise where there is no elegant way to allocate space for all items within a table layout. In particular, if despite the application of the first and second principles more space is still needed to accommodate the item at issue, then such space is added to the right-most column for the item at issue, regardless of the fact that such added space may not be optimal and could cause other items to appear awkward within the context of the table layout.

Thus, in the present invention, Rule 1 is applied to order the items prior to allocating space for same in the table layout, and each item is thus allocated space in the table layout in the order set by application of Rule 1. Correspondingly, Rule 2 is applied when actually allocating space for each such item as ordered by Rule 1.

Note that the heuristic set out according to Rules 1 and 2 is believed to optimize space allocation in most instances of a table layout. However, it is possible that under some unusual circumstances application of such heuristic may result in non-optimal space allocation. Nevertheless, application of such heuristic is still within the scope of the present invention regardless of whether such heuristic in fact results in optimal space allocation in a table layout.

Figures 6A, 6B, 6C:
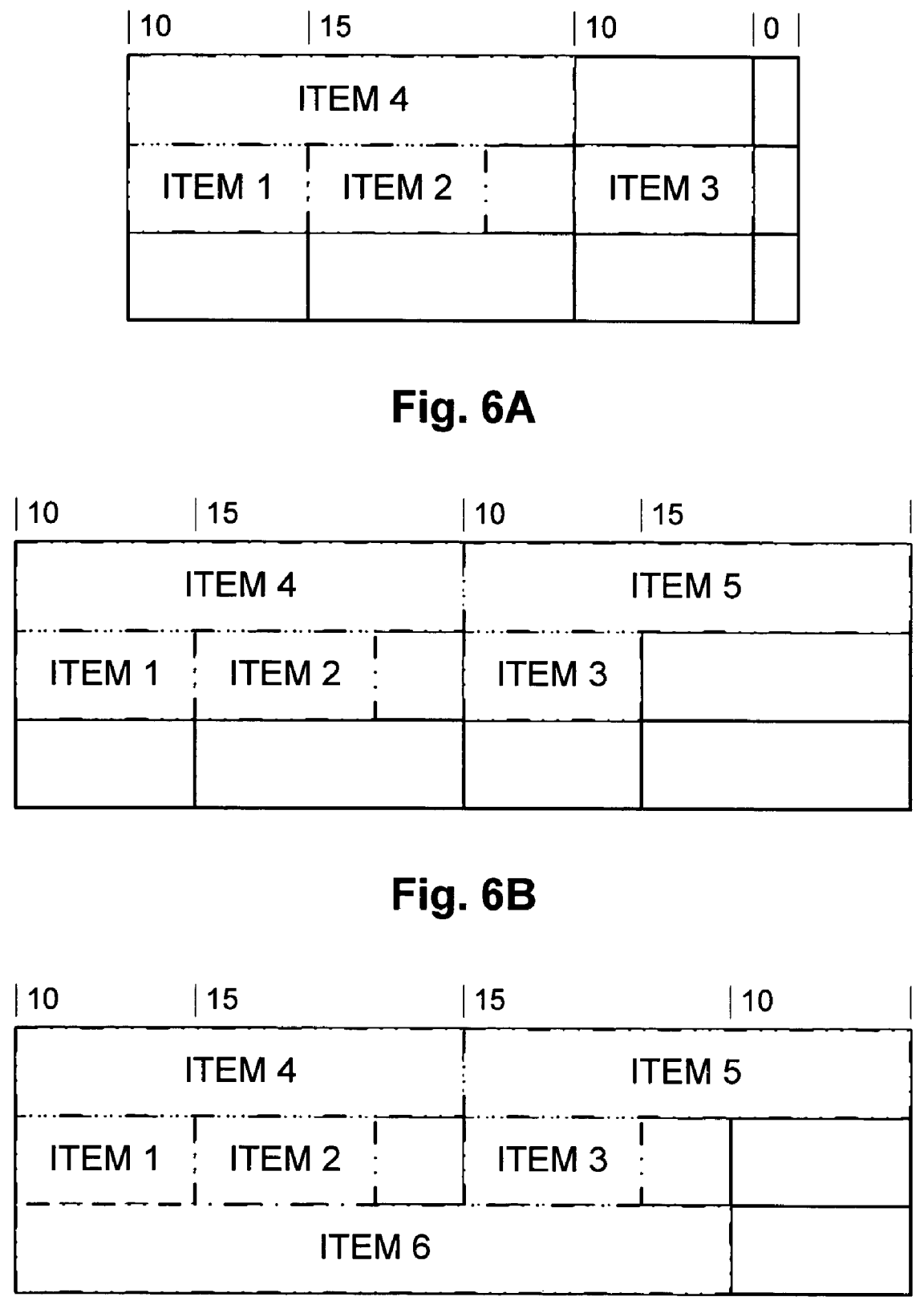

Turning now to FIGS. 6A-6C, an example of a space allocation for a table layout in accordance with the present invention is shown. As seen, such table layout includes three rows, four columns, and six defined items:

- an item 1 in row 2, column 1 only with a 10 pixel column width;
- an item 2 in row 2, column 2 only with a 10 pixel column width;
- an item 3 in row 2, column 3 only with a 10 pixel column width;
- an item 4 in row 1, columns 1-2 with a 25 pixel column width;
- an item 5 in row 1, columns 3-4 with a 25 pixel column width; and
- an item 6 in row 1, columns 1-3 with a 40 pixel column width.

If, as is seen in FIG. 6A, and according to Rule 1, items 1-3 are already added and item 4 is then added fourth, it is seen that column width for item 4 is created by adding 5 pixels to column 2. In particular, the steps of Rule 2 as shown in FIG. 5 proceed all the way to (H) inasmuch as both spanned columns of item 4 are left-most columns for other items (items 1 and 2) (B), the next column to the right (column 3) exists (D), and another item (item 3) starts in the column to the right (F). Therefore, according to (H), column 2 as the right-most column of item 4 is expanded from 10 to 15 pixels to accommodate the 5 pixels of item 4 not already available from column 1 (by way of the 10-pixel item 1 already therein) and column 2 (by way of the 10-pixel item 2 already therein).

Turning now to FIG. 6B, upon item 5 being added fifth, it is seen that column width for item 5 is created by adding 15 pixels to column 4. In particular, the steps of Rule 2 as shown in FIG. 5 proceed only to step (C) inasmuch as one of the spanned columns (column 4) of item 5 is not a left-most column for any other item (B). Therefore, according to (C), column 4 as the right-most non-serving column of item 5 is expanded from 0 to 15 pixels to accommodate the 10 pixels of item 5 not already available from column 3 (by way of the 10-pixel item 3 already therein).

Finally, turning now to FIG. 6C, upon item 6 being added sixth, it is seen that column width for item 6 is created by removing 5 pixels from column 4 and adding same to column 3. In particular, the steps of Rule 2 as shown in FIG. 5 proceed to step (G) inasmuch as all spanned columns of item 6 are left-most columns for other items (items 1-3 and 5) (B), the next column to the right (column 4) exists (D), and no other item starts in the column to the right (F). Therefore, according to (G), 5 pixels are removed from column 4 and added to column 3 to expand such column 3 from 10 to 15 pixels to accommodate the 5 pixels of item 4 not already available from columns 1 and 2 (by way of the 25-pixel item 4 already therein).

As may be appreciated, the heuristic set out in FIG. 5 is particularly useful in that such heuristic may be performed in real-time or near-real-time in response to a change to a table layout or the contents thereof. Thus, no appreciable delay should be experienced when space is re-allocated within such table layout in response to the change. Significantly, the heuristic does not perform any unusual or exotic calculations, such as solving systems of equations, where such calculations by their nature require significant amounts of time and thus cause an appreciable delay.

In a variation of the present invention, even if the column to the right is the left-most column for another item, as determined at step (F), space is borrowed from such column in a manner akin to that set forth in step (G), presuming that such borrowed space does not impinge on the another item. For example, if by some arrangement the column to the right is 15 pixels wide but the another item in such column is only 10 pixels wide, up to 5 pixels may be borrowed and transferred to the right-most column for the item at issue. Note, though, that such variation may require a potentially excessive number of calculations and significant additional time and thus cause an appreciable delay. Accordingly such a variation should be employed with caution.

Note that in some table layouts, each of at least some columns thereof may have a minimum width or a fixed width. In such situation where there is a limitation on column width, it is to be appreciated that the space allocation heuristic of the present invention should respect such column width limitation while allocating space to such column.

CONCLUSION

The present invention may be practiced with regard to allocating space for any appropriate items and table layout of such items. As should now be appreciated, with the present invention as set forth herein, space may be allocated for a table layout in at least a near-optimal manner so that items are presented within the table layout with efficient space utilization and in an aesthetic manner.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method for allocating space in a table layout, including a heuristic that is not complex and therefore can be performed in real-time or near-real-time in response to changes to a dynamic table layout. The heuristic finds or at least approximates an ideal distribution of items within a table layout in most cases, without solving systems of equations.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A method of allocating space within a table layout for a plurality of items to be placed therein, the table layout including a plurality of cells arranged in rows and columns, each item having a defined width and a defined location including a left-most column and a number of columns spanned from such left-most column, each column having a uniform width adjustable to accommodate the defined width of an item placed in such column, the method comprising, for each item at issue:

determining the columns of the table layout spanned by the item at issue;

determining whether any of the spanned columns do not serve as the left-most column for any other item for which space has already been allocated in the table layout; and if any spanned column does not serve as such a left-most column, expanding a right-most non-serving spanned column to provide space to accommodate the item at issue.

2. The method of claim 1 further comprising, if each spanned column does serve as such a left-most column, determine if a next column to the right of the item at issue exists, and if not, expanding a right-most column of the item at issue to provide space to accommodate same.

3. The method of claim 2 further comprising, if a next column to the right of the item at issue exists, determining whether such column to the right is the left-most column for any other item for which space has already been allocated, and if not, removing any space available from such column to the right and adding such removed space to the right-most column for the item at issue.

4. The method of claim 3 further comprising, if such column to the right is the left-most column for any other item for which space has already been allocated, adding space to accommodate the item at issue to the right-most column for the item at issue.

5. The method of claim 3 further comprising, if after removing any space available from such column to the right and adding such removed space to the right-most column for the item at issue, space is still required for such item at issue, adding space to accommodate the item at issue to the right-most column for the item at issue.

6. The method of claim 2 further comprising, if a next column to the right of the item at issue exists, determining whether such column to the right is the left-most column for any other item for which space has already been allocated, and if so, removing any space available from such column to the right not employed by the other item and adding such removed space to the right-most column for the item at issue.

7. The method of claim 6 further comprising, if after removing any space available from such column to the right and adding such removed space to the right-most column for the item at issue, space is still required for such item at issue, adding space to accommodate the item at issue to the right-most column for the item at issue.

8. The method of claim 1 further comprising allocating space for each item in the table layout according to increasing column span for the item.

9. A method of allocating space within a table layout for a plurality of items to be placed therein, the table layout including a plurality of cells arranged in rows and columns, each item having a defined height and a defined location including a top-most row and a number of rows spanned from such top-most row, each row having a uniform height adjustable to accommodate the defined height of an item placed in such row, the method comprising, for each item at issue:

determining the rows of the table layout spanned by the item at issue;

determining whether any of the spanned rows do not serve as the top-most row for any other item for which space has already been allocated in the table layout; and if any spanned row does not serve as such a top-most row, expanding a bottom-most non-serving spanned row to provide space to accommodate the item at issue.

10. The method of claim 9 further comprising, if each spanned row does serve as such a top-most row, determine if a next row toward the bottom of the item at issue exists, and if not, expanding a bottom-most row of the item at issue to provide space to accommodate same.

11. The method of claim 10 further comprising, if a next row toward the bottom of the item at issue exists, determining whether such row toward the bottom is the top-most row for any other item for which space has already been allocated, and if not, removing any space available from such row toward the bottom and adding such removed space to the bottom-most row for the item at issue.

12. The method of claim 11 further comprising, if such row toward the bottom is the top-most row for any other item for which space has already been allocated, adding space to accommodate the item at issue to the bottom-most row for the item at issue.

13. The method of claim 11 further comprising, if after removing any space available from such row toward the bottom and adding such removed space to the bottom-most row for the item at issue, space is still required for such item at issue, adding space to accommodate the item at issue to the bottom-most row for the item at issue.

14. The method of claim 10 further comprising, if a next row toward the bottom of the item at issue exists, determining whether such row toward the bottom is the top-most row for any other item for which space has already been allocated, and if so, removing any space available from such row toward the bottom not employed by the other item and adding such removed space to the bottom-most row for the item at issue.

15. The method of claim 14 further comprising, if after removing any space available from such row toward the bottom and adding such removed space to the bottom-most row for the item at issue, space is still required for such item at issue, adding space to accommodate the item at issue to the bottom-most row for the item at issue.

16. The method of claim 9 further comprising allocating space for each item in the table layout according to increasing row span for the item.

17. A method of allocating space within a table layout for a plurality of items to be placed therein, the table layout including a plurality of cells arranged in rows and columns, each item having a defined width and a defined location including a left-most column and a number of columns spanned from such left-most column, each column having a uniform width adjustable to accommodate the defined width of an item placed in such column, the method comprising, for each item at issue:

determining the columns of the table layout spanned by the item at issue; and determining whether any of the spanned columns do not serve as the left-most column for any other item for which space has already been allocated in the table layout, wherein if any spanned column does not serve as such a left-most column, expanding a right-most non-serving spanned column to provide space to accommodate the item at issue, and if any spanned column does serve as such a left-most column, determining if a next column to the right of the item at issue exists, and wherein if no next column to the right of the item at issue exists, expanding a right-most column of the item at issue to provide space to accommodate same, and if a next column to the right of the item at issue exists, determining whether such column to the right is the left-most column for any other item for which space has already been allocated, and if not, removing any space available from such column to the right and adding such removed space to the right-most column for the item at issue.

\* \* \* \* \*